(12) United States Patent
Shitagami et al.

(10) Patent No.: US 8,815,330 B2
(45) Date of Patent: Aug. 26, 2014

(54) METHOD FOR MANUFACTURING ELECTROPHORETIC DISPLAY APPARATUS

(75) Inventors: Kozo Shitagami, Chino (JP); Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 242 days.

(21) Appl. No.: 13/083,999

(22) Filed: Apr. 11, 2011

(65) Prior Publication Data

US 2011/0256306 A1    Oct. 20, 2011

(30) Foreign Application Priority Data

Apr. 14, 2010 (JP) ................. 2010-093210

(51) Int. Cl.
| | |
|---|---|
| *B05D 5/12* | (2006.01) |
| *G01D 9/42* | (2006.01) |
| *G09G 3/36* | (2006.01) |
| *B41J 2/16* | (2006.01) |
| *C09J 101/00* | (2006.01) |
| *C09J 201/00* | (2006.01) |
| *G02F 1/167* | (2006.01) |

(52) U.S. Cl.
CPC ........ *G02F 1/167* (2013.01); *G02F 2001/1672* (2013.01); *G02F 2001/1678* (2013.01)
USPC ............... 427/58; 345/107; 345/90; 156/326; 156/331.4

(58) Field of Classification Search
CPC ............ G02F 1/167; G02F 2001/1672; G02F 2001/1678
USPC .......................................................... 427/58
See application file for complete search history.

(56) References Cited

U.S. PATENT DOCUMENTS

| | | | |
|---|---|---|---|
| 6,750,844 B2 | 6/2004 | Nakanishi | |
| 7,166,182 B2 * | 1/2007 | Pereira et al. | ................. 156/326 |
| 7,385,751 B2 | 6/2008 | Chen et al. | |
| 7,572,491 B2 | 8/2009 | Wang et al. | |
| 7,729,040 B2 | 6/2010 | Uchida | |
| 2003/0227436 A1 | 12/2003 | Ikeda | |
| 2004/0135764 A1* | 7/2004 | Takeda | .......................... 345/107 |

(Continued)

FOREIGN PATENT DOCUMENTS

| | | |
|---|---|---|
| JP | A-5-247354 | 9/1993 |
| JP | A-11-71526 | 3/1999 |

(Continued)

OTHER PUBLICATIONS

Heui-Hsiung Wang, Tien-Wei Shyr, Mei-Shan Hu. The Elastic Polyvinyl Alcohol Gel with Boric Acid as a Crosslinking Agent. 1999. Journal of Applied Polymer Science, vol. 74, pp. 3046-3052.*

(Continued)

*Primary Examiner* — Dah-Wei D Yuan
*Assistant Examiner* — Kristen A Dagenais
(74) *Attorney, Agent, or Firm* — Oliff PLC

(57) ABSTRACT

The following is included: loading cells spatially defined by partitions with a dispersion liquid containing electrophoretically mobile particles and a dispersion medium for dispersing the electrophoretically mobile particles, and covering the exposed surface of the dispersion liquid loaded in the cells with a sealing coating to seal the dispersion liquid in the cells. The dispersion medium is a lipophilic hydrocarbon solvent, and the sealing coating is made from a material containing a water-soluble polymer.

5 Claims, 4 Drawing Sheets

(56) References Cited

U.S. PATENT DOCUMENTS

2006/0132579 A1    6/2006  Daniel et al.
2009/0051646 A1    2/2009  Daniel et al.
2009/0201239 A1*   8/2009  Kokeguchi ............... 345/90

FOREIGN PATENT DOCUMENTS

| JP | A-2002-139749 | 5/2002 |
| JP | A-2002-244163 | 8/2002 |
| JP | A-2004-12949 | 1/2004 |
| JP | A-2005-10796 | 1/2005 |
| JP | A-2006-505013 | 2/2006 |
| JP | A-2006-178456 | 7/2006 |
| JP | A-2006-517038 | 7/2006 |
| JP | A-2008-107484 | 5/2008 |
| JP | A-2009-222902 | 10/2009 |
| JP | A-2009-234188 | 10/2009 |
| WO | WO 2004/042464 A2 | 5/2004 |

OTHER PUBLICATIONS

V&P Scientific, Inc., Viscosity Tables, Apr. 10, 2005, http://www.vp-scientific.com/Viscosity_Tables.htm.*
Austin Community College. Ionic, Polar, and Non-polar Molecules. Jul. 9, 2013, http://www.austincc.edu/emeyerth/polarity.html.*

* cited by examiner

METHOD FOR MANUFACTURING ELECTROPHORETIC DISPLAY APPARATUS

CROSS-REFERENCE TO RELATED APPLICATION

This application is based on and claims priority from Japanese Patent Application No. 2010-093210, filed on Apr. 14, 2010, the contents of which are incorporated herein by reference.

BACKGROUND

1. Technical Field

The present invention relates to a method for manufacturing an electrophoretic display apparatus.

2. Related Art

It is generally known that applying an electric field to a liquid dispersion system containing dispersed fine particles makes the fine particles move (migrate) in the liquid through the action of Coulomb force. This phenomenon is referred to as electrophoresis, and recently electrophoretic display apparatuses, which make use of electrophoresis to display some desired information (image), have attracted public attention as a new generation of display apparatuses. The features of electrophoretic display apparatuses include the ability to hold the displayed information even with no voltage applied, a wide viewing angle, a high-contrast display capability with low power consumption, and so forth.

Furthermore, electrophoretic display apparatuses, which are non-luminous devices, are friendlier to eyes than cathode ray tubes (CRTs) and other self-luminous devices. A known constitution of electrophoretic display apparatuses is that in which a pair of substrates have the space therebetween divided by partitions into several subspaces (hereinafter also referred to as cells) and the cells are sealed after being loaded with dispersion liquid (containing charged particles and a dispersion medium) (e.g., see JP-A-2008-107484). Another known constitution is that in which a fluorine-containing solvent is used as the dispersion medium of the dispersion liquid (see JP-T-2006-517038). Each cell has an opening through which it is loaded with the dispersion liquid. After the cells are loaded with the dispersion liquid, the openings are sealed with a sealing coating.

Using a fluorine-containing solvent as the dispersion medium will prevent the dispersion liquid and the sealing coating from being mixed (i.e., blended). This is because fluorine-containing solvents have a low affinity with both hydrophilic materials and lipophilic ones and thus are substantially immiscible with them. Furthermore, the dispersion medium can be a solvent having a higher specific gravity than that of the sealing coating; this will prevent physical mixing of the sealing coating and the dispersion liquid.

As mentioned above, the technology disclosed in JP-T-2006-517038 uses a fluorine-containing solvent as the dispersion medium. This will prevent the blending of the dispersion liquid and the sealing coating. However, fluorine-containing solvents are difficult to synthesize, and materials for them are expensive. Worse yet, there are only a few kinds of fluorine-containing solvents available, limiting the choice of solvent.

Thus, the present inventor has been focusing on hydrocarbon solvents, which are available at affordable prices. Hydrocarbon solvents are easier to manufacture than fluorine-containing ones; for example, the manufacturing cost of the former is one digit smaller than the latter's. Using a hydrocarbon solvent as the dispersion medium will therefore reduce the manufacturing cost of an electrophoretic display apparatus.

However, the use of a hydrocarbon solvent may cause the blending of the dispersion liquid and the sealing coating. For example, using a lipophilic sealing coating concomitantly with a lipophilic hydrocarbon solvent may result in the sealing coating at least in part dissolved in the dispersion liquid and the sealing coating and the dispersion liquid being blended, leading to incomplete sealing of the dispersion liquid. The present inventor actually made a coating of such a polyurethane-based acrylic resin as specified in JP-T-2006-517038 and IRGACURE® 907 and attempted to seal a (fluorine-free) hydrocarbon solvent with it, but unfortunately the sealing coating and the solvent were blended.

The technology disclosed in JP-T-2006-517038 does not necessitate making the sealing coating from a material substantially immiscible with the dispersion liquid because with this technology the sealing coating and the dispersion liquid will never be blended even if the dispersion liquid loaded in the cells is contaminated by or coated with the sealing coating whether the sealing coating is hydrophilic or lipophilic. On the other hand, using a hydrocarbon solvent as the dispersion medium may cause the sealing coating and the dispersion liquid to be blended and thus poses the problem of the need for making the sealing coating from a material substantially immiscible with the dispersion liquid.

SUMMARY

An advantage of some aspects of the invention is that they make possible to manufacture an electrophoretic display apparatus free from the blending of the dispersion liquid and the sealing coating at reduced material cost.

To provide this advantage, the method for manufacturing an electrophoretic display apparatus according to an aspect of the invention includes the following: loading cells spatially defined by partitions with a dispersion liquid containing electrophoretically mobile particles and a dispersion medium for dispersing the electrophoretically mobile particles, and covering the exposed surface of the dispersion liquid loaded in the cells with a sealing coating to seal the dispersion liquid in the cells. The dispersion medium is a lipophilic hydrocarbon solvent, and the sealing coating is made from a material containing a water-soluble compound. To be able to form a coating easily, the water-soluble compound is preferably a water-soluble polymer.

A method designed as above allows using a hydrocarbon solvent, which is available at affordable prices, as the dispersion medium and thereby reduces the cost of the materials for the dispersion liquid. As a result, the manufacturing cost of the electrophoretic display apparatus is reduced. Furthermore, the dispersion liquid and the sealing coating will be prevented from being mixed (i.e., blended), and thus the dispersion liquid can be kept tightly sealed in the cells.

In another exemplary design, the sealing coating is soluble in water, while the dispersion liquid is insoluble in water. With this design, the sealing coating and the dispersion liquid can be separated by immersion in water or any other appropriate way before the electrophoretic display apparatus is discarded. This makes it possible to collect the dispersion liquid only. It becomes easy to recycle the dispersion liquid.

In the method for manufacturing an electrophoretic display apparatus described above, the water-soluble polymer, if it is used, may be polyvinyl alcohol (also referred to as PVA). PVA is a highly versatile and inexpensive material, and the use of PVA will therefore reduce the cost of the materials for the sealing coating. Furthermore, a sealing coating made from PVA can be dried and cured simply by leaving it for several hours at a moderate temperature, for example, any temperature in the range of room temperature to approximately 50 [° C.]. Allowing drying the sealing coating by air-drying or at a relatively low temperature, this design of the method provides energy savings and is environmentally friendly.

If PVA or any other kind of water-soluble polymer is used in the method for manufacturing an electrophoretic display apparatus described above, the sealing coating may further contain a thickening agent to have an increased viscosity. This allows the sealing coating to have a relatively high and controlled degree of viscosity.

If a thickening agent is used for that purpose in the method for manufacturing an electrophoretic display apparatus described above, it may be a gelatinizing agent that turns the sealing coating into a gel by linking the molecules of the water-soluble polymer at several points via some kind of intermolecular force (e.g., hydrogen bonds, coordinate bonds, or covalent bonds). In other words, the thickening agent may be a gelatinizing agent that links the molecules of the water-soluble polymer to form a gel. This gelatinizing agent, if it is used, may be one that forms a gel through intermolecular interactions with the water-soluble polymer at several points. In this case, an aqueous solution of the water-soluble polymer can be turned into a gel by simply mixing it with the gelatinizing agent. There is no need to expose the aqueous solution to light, heat, or any other energy source or use any expensive reagent (e.g., UV [ultraviolet]-curable resin or a UV curing initiator) or catalyst to turn the aqueous solution into a gel. The gel of the aqueous solution can be formed easily and at low cost.

Even if containing a gelatinizing agent, the sealing coating is still soluble in water because of the water solubility of the water-soluble polymer or PVA. Thus, also in this case, the sealing coating and the dispersion liquid can be separated by immersion in water or any other appropriate way before the electrophoretic display apparatus is discarded, and this makes it possible to collect the dispersion liquid only. It becomes easy to recycle the dispersion liquid.

In the method for manufacturing an electrophoretic display apparatus described above, if a gelatinizing agent is used for the purpose described above, it may be boric acid. Boric acid is a highly versatile and inexpensive material, and the use of boric acid will therefore reduce the material cost.

Incidentally, the method for manufacturing an electrophoretic display apparatus described above may further include curing the sealing coating by drying the sealing coating covering the exposed surface of the dispersion liquid. This design of the method allows water in the sealing coating to vaporize to make the sealing coating thinner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
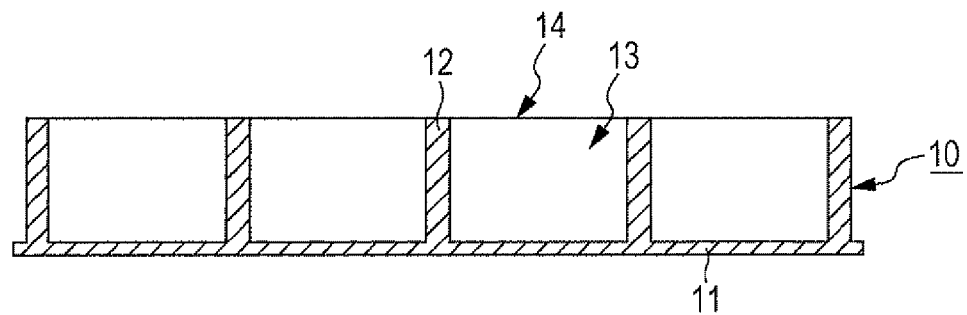
FIG. 1 is a diagram (1) illustrating the method for manufacturing an electrophoretic display apparatus according to an embodiment of the invention.

The following describes some embodiments of the invention with reference to the accompanying drawings. In the drawings mentioned below, like numbers reference like elements, each of which is explained only once.

I. First Embodiment

FIGS. 1 to 6 are diagrams illustrating the method for manufacturing an electrophoretic display apparatus 100 according to an embodiment of the invention.

Figure 7A:
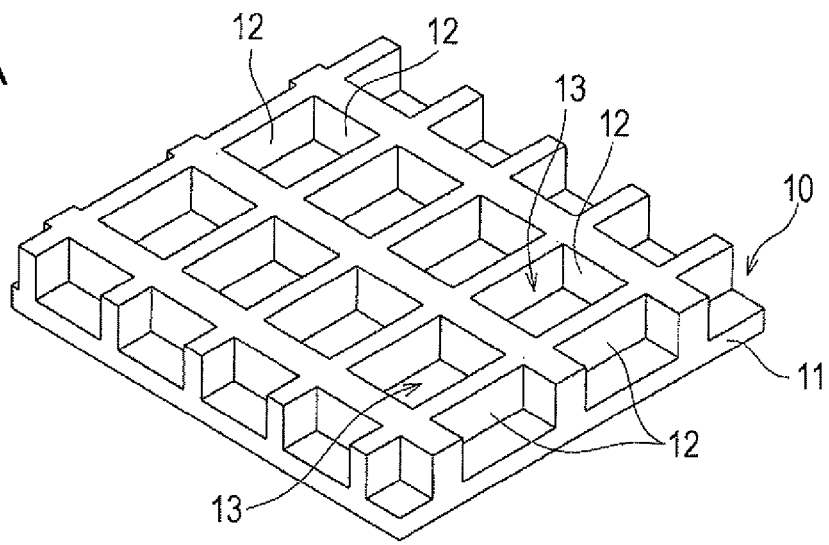
FIGS. 7A to 7C illustrate exemplary constitutions of a cell matrix.

As illustrated in FIG. 1, a structure 10 is first prepared to have a plurality of cells 13 spatially defined by partitions 12. (Hereinafter this structure is referred to as a cell matrix 10.) This cell matrix 10 has a flat substrate 11, and the partitions 12 are arranged on either side of this substrate 11. As illustrated in FIG. 7A, these partitions 12 divide the space on the substrate 11 to provide the cells 13. The partitions 12, on their plan view, are in a form such as a square grid. The cell matrix 10, which has the partitions 12 constituted as above, is made from a resin material such as epoxy resin, acrylic resin, urethane resin, melamine resin, or phenol resin, a ceramic material such as silica, alumina, or titania, or any other appropriate material.

Figure 7B:
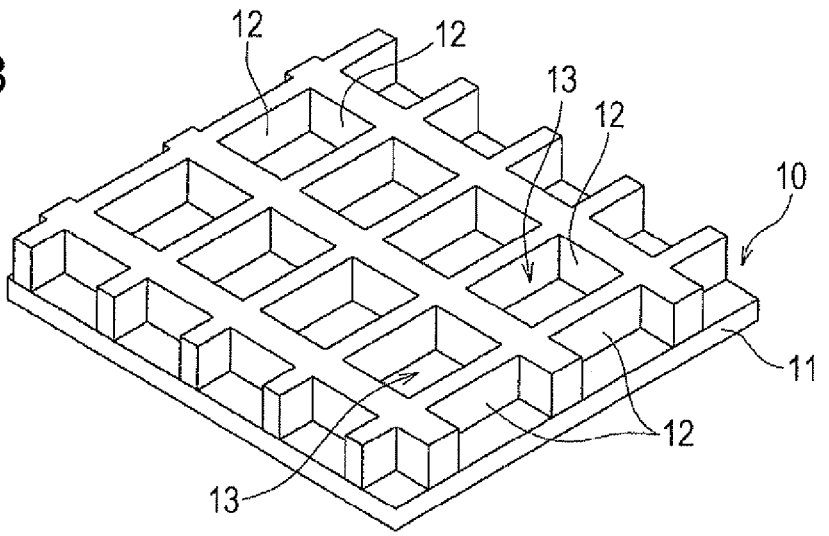
Figure 7C:
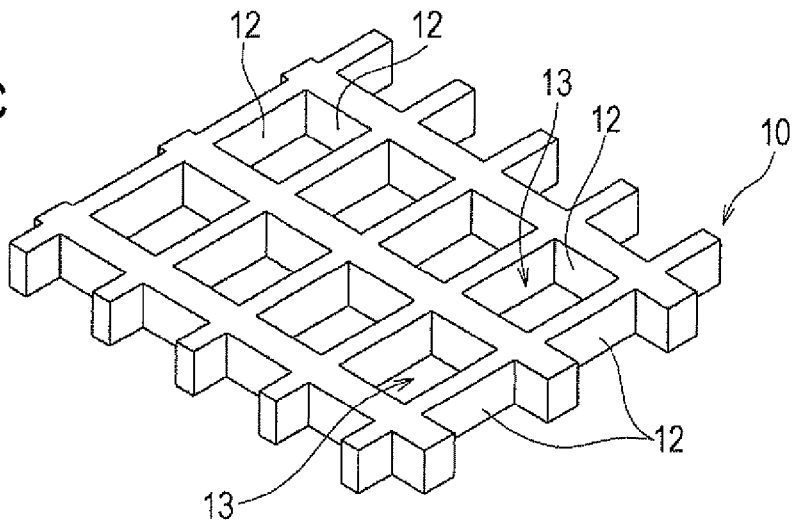

FIGS. 1, 7A, and some other drawings illustrate a constitution in which the partitions 12 and the flat substrate 11 form a solid structure, but this constitution is just an example. This embodiment also allows constitutions like that illustrated in FIG. 7B, in which partitions 12 and a flat substrate 11 are formed separately and then the partitions 12 are fixed to either side of the flat substrate 11. Furthermore, as illustrated in FIG. 7C, the cell matrix 10 may be formed only by partitions 12. In this case, it is allowed to attach the cell matrix 10 to a circuit board 50 (e.g., see FIG. 5), which will be described later, before the cells 13 are loaded with dispersion liquid (e.g., see FIG. 2). This allows the cells 13 to be loaded with dispersion liquid with the bottom of each cell 13 is sealed with the circuit board 50 (i.e., with the circuit board 50, instead of the substrate 11, serving as the bottom of the cells 13).

Furthermore, the form of the partitions 12 on their plan view is not limited to a square grid; for example, it may be a honeycomb grid or a triangle grid. Moreover, the thickness of the substrate is not limited; for example, the substrate may be a thin film having a thickness on the order of a few micrometers [μm] to several tens of micrometers [μm].

Figure 2:
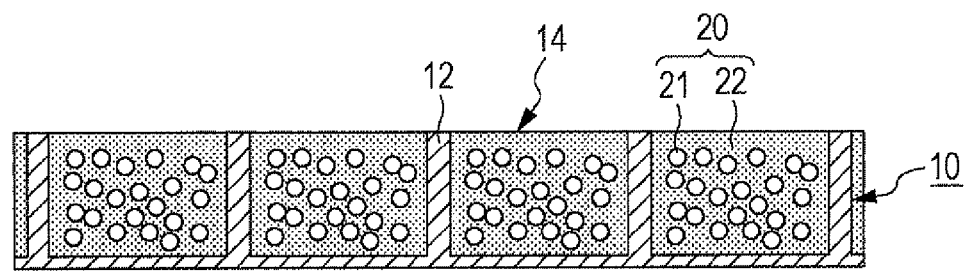
FIG. 2 is a diagram (2) illustrating the method for manufacturing an electrophoretic display apparatus according to an embodiment of the invention.

Then, as illustrated in FIG. 2, each cell 13 of the cell matrix 10 is loaded with dispersion liquid 20 introduced via an opening 14 formed on that cell 13. Here, the dispersion liquid 20 is a liquid containing a plurality of electrophoretically mobile particles 21 and a dispersion medium 22 for dispersing these electrophoretically mobile particles 21.

Examples of the electrophoretically mobile particles 21 include pigment particles, resin particles, and particle mixtures of them. When pigment particles are used, examples of the pigments that can be used as a component of the pigment particles include black pigments such as aniline black and carbon black, and white pigments such as titanium oxide and antimony oxide. When resin particles are used, examples of the resin materials that can be used as a component of the resin particles include acrylic resin, urethane resin, urea resin, epoxy resin, polystyrene, and polyesters. When a particle mixture is used, its examples include pigment particles coated on their surface with a resin material or a different kind of pigment, resin particles coated on their surface with pigment, and particles of a mixture containing pigment and resin material at an appropriate composition ratio. The electrophoretically mobile particles 21, which are made from any of such materials, are dispersed in the dispersion medium in a form such as positively or negatively charged particles.

The dispersion medium 22 is a lipophilic hydrocarbon solvent, such as Isopar®. Specific examples of the dispersion medium 22 include liquids containing any one of Isopar E, Isopar G, Isopar H, and Isopar L, liquid mixtures of two or more kinds of these Isopar solvents, and liquid mixtures of one or more kinds of these Isopar solvents and a different kind of hydrocarbon solvent.

Examples of the methods that can be used to load the cells 13 with the dispersion liquid include dripping with a dispenser, ink jet ejection (discharge of droplets), and application by spin coating, dip coating, spray coating, or any other coating technique. In particular, dripping and ink jet ejection are preferable. Using dripping or ink jet ejection allows the dispersion liquid to be applied selectively to target areas and thereby ensures that the cells 13 are loaded with the dispersion liquid more accurately than in other methods and with no waste of the dispersion liquid.

Figure 3:
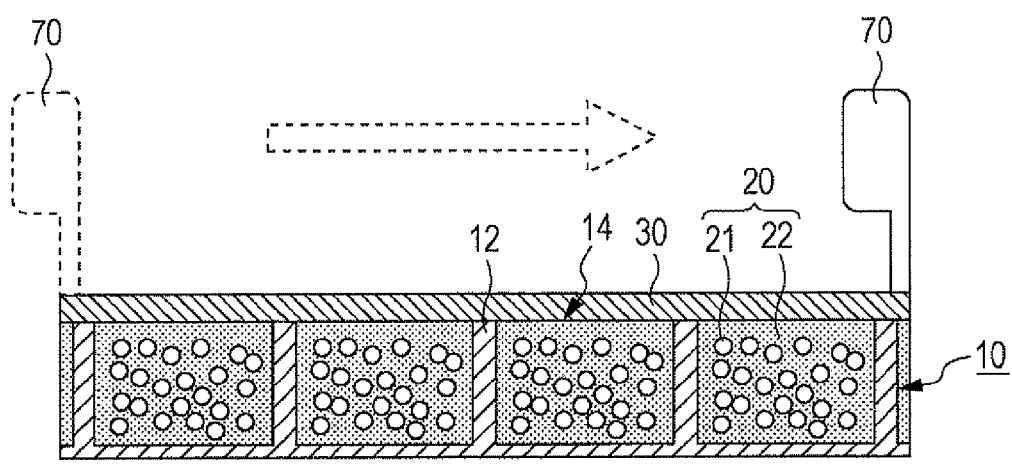
FIG. 3 is a diagram (3) illustrating the method for manufacturing an electrophoretic display apparatus according to an embodiment of the invention.

Then, as illustrated in FIG. 3, the cell matrix 10 loaded with the dispersion liquid 20 is covered on the side having the openings 14 with a sealing coating 30 so that the individual cells of the cell matrix 10 should contain the dispersion liquid 20 sealed therein. Here, the sealing coating 30 is a coating containing a water-soluble polymer, for example, a coating containing polyvinyl alcohol (also referred to as PVA). The water-soluble polymer for the sealing coating 30 is not limited to polyvinyl alcohol; for example, it may be an amino acid, gum arabic, an alginic acid derivative, an albumin, carboxymethyl cellulose, a cellulose derivative, gelatin, polyethylene oxide, polystyrene sulfonate, polyvinyl pyrrolidone, polyvinyl phenol, a polyvinyl acetate derivative, or lecithin.

A specific example of ways to form such a sealing coating 30 is as follows. First, a water-soluble polymer is dissolved in water or any other kind of hydrophilic liquid (e.g., methanol or ethanol) to turn into a liquid form to provide sealing solution. For example, PVA as the water-soluble polymer is dissolved in water to provide a sealing solution having a concentration in the range of 3 [wt %] (percent by weight) to 40 [wt %]. Then, this sealing solution is applied to cover the cell matrix 10 on the side having the openings 14 to form the sealing coating 30. The dispersion liquid 20 is lipophilic, whereas the sealing coating 30 is hydrophilic, and therefore the dispersion liquid 20 and the sealing coating 30 are immiscible. This is the reason why the sealing coating 30 formed to seal the exposed surface of the dispersion liquid 20 loaded into the cells 13 ensures that the dispersion liquid 20 is kept tightly sealed in the cells 13.

Incidentally, the sealing solution can be applied in various ways, including using a squeegee 70 to apply the sealing solution to uniformly cover the whole surface of the cell matrix 10 on the side having the openings 14. Examples of the other ways to apply the sealing solution include application with a die coater or a so-called comma coater.

Figure 4:
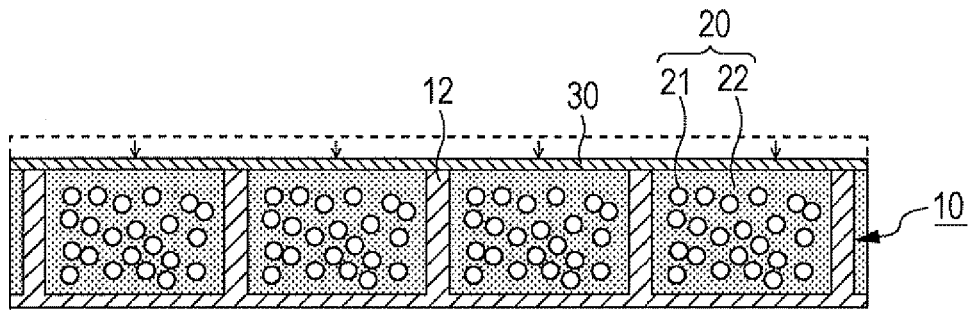
FIG. 4 is a diagram (4) illustrating the method for manufacturing an electrophoretic display apparatus according to an embodiment of the invention.

Then, the sealing coating 30, formed by the application of the sealing solution, is dried until it is cured. For example, the sealing coating 30 is dried and cured by leaving it at a temperature in the range of room temperature to approximately 50 [° C.]. Depending on the thickness of the sealing coating 30, the length of time required to complete this drying process is on the order of minutes to hours. The high concentration of the water-soluble polymer or PVA in the sealing coating 30 allows drying the sealing coating 30 by air-drying or at a relatively low temperature. As illustrated in FIG. 4, this drying process makes water vaporize (i.e., evaporate) out of the sealing coating 30 and thereby makes the sealing coating 30 thinner than it was immediately after being formed.

Figure 5:
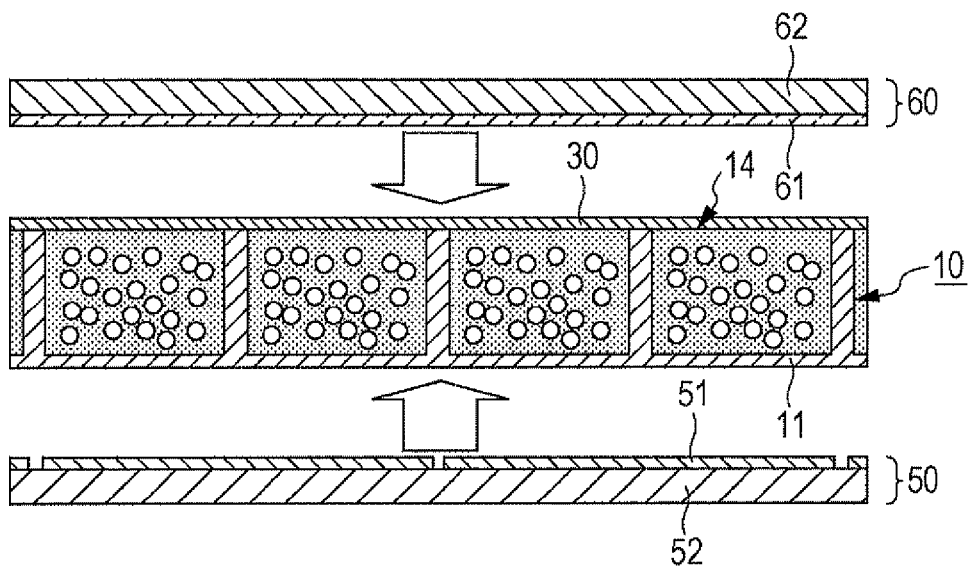
FIG. 5 is a diagram (5) illustrating the method for manufacturing an electrophoretic display apparatus according to an embodiment of the invention.

Then, as illustrated in FIG. 5, a circuit board 50 is prepared to have pixel electrodes 51, and an opposite board 60 to have an opposite electrode 61. The circuit board 50 has, in its exemplary constitution, a flat substrate 52 and a plurality of pixel electrodes 51 formed on either side of this substrate 52. Although not illustrated in the drawing, this circuit board 50 has a plurality of pixel transistors (e.g., TFTs [thin film transistors]) formed on the side having the pixel electrodes 51 or the other side of the substrate 52, and the pixel transistors are individually connected via wiring to the pixel electrodes 51. This circuit board 50 allows turning on selected ones of the pixel transistors and keeping the others off so that voltage can be applied to selected ones of the pixel electrodes 51. On the other hand, the opposite board 60 has, in its exemplary constitution, a flat substrate 62 and an opposite electrode 61 formed on either side of this substrate 62. The opposite electrode 61 is a common electrode.

Incidentally, the substrates 52 and 62 are made of an insulating resin material such as polycarbonate (PC) or polyethylene terephthalate (PET) (i.e., resin substrates), glass, or any other appropriate material. If one wants to give the electrophoretic display apparatus 100 some flexibility, they should use flexible resin substrates as the substrates 52 and 62. The pixel electrodes 51 are formed from a conductive film made of aluminum (Al) or any other conductive material. On the other hand, the opposite electrode 61 is formed from an optically transparent and clear conductive film made of indium tin oxide (i.e., ITO) or any other appropriate materials.

Figure 6:
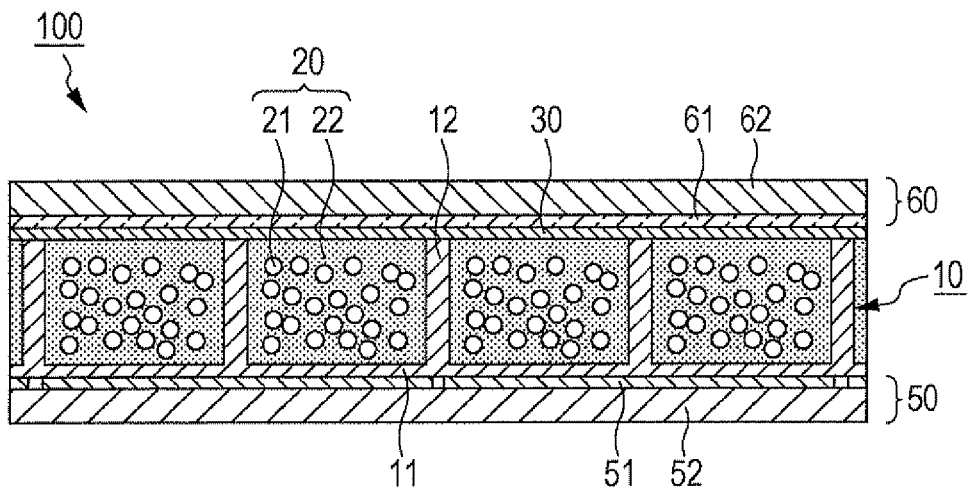
FIG. 6 is a diagram (6) illustrating the method for manufacturing an electrophoretic display apparatus according to an embodiment of the invention.

Then, the circuit board 50 and the opposite board 60 described above are individually attached to the cell matrix 10. In this process, as illustrated in FIG. 5, the circuit board 50 is attached with the side having the pixel electrodes 51 facing the side having the substrate 11 of the cell matrix 10. Likewise, the opposite board 60 is attached with the side having the opposite electrode 61 facing the side having the sealing coating 30 (i.e., the side having the openings 14) of the cell matrix 10. It is allowed in this attachment process to use an adhesive agent (not illustrated in the drawing) or any other appropriate substance. Through the processes described above, an electrophoretic display apparatus 100 like that illustrated in FIG. 6 is completed.

Some advantages of the manufacturing method described above (i.e., those of the first embodiment) are summarized in Table 1.

TABLE 1

| Material cost | Optical transparency | Miscibility between sealing coating and dispersion liquid | Drying | Recycling |
|---|---|---|---|---|
| Low | Approx. 90% | Extremely low | Room temperature to approx. 50° C. | Possible |

In the first place, as shown in Table 1, hydrocarbon solvents (e.g., Isopar solvents) and PVA are all available at affordable prices. The manufacturing cost of the electrophoretic display apparatus will be reduced accordingly. Furthermore, the sealing coating can be formed as a colorless and transparent one, and this will ensure an optical transparency of approximately 90%. The sealing coating will allow light to pass through with little attenuation, and thus letters, images, and all other forms of information displayed on the cell matrix, which is covered with this sealing coating, will be highly visible. Furthermore, the sealing coating and the dispersion liquid are substantially immiscible, and thus the dispersion liquid can be kept tightly sealed in the cells. Moreover, the sealing coating can be dried easily; it can be dried out at a temperature in the range of room temperature to approximately 50 [° C.]. Allowing drying the sealing coating by air-drying or at a relatively low temperature, or in other words eliminating the need for drying at a high temperature, the manufacturing method according to this embodiment provides energy savings and is environmentally friendly. Additionally, the sealing coating can be dried out in a relatively short period of time, and this will shorten the whole manufacturing process.

In addition, the sealing coating is soluble in water. On the other hand, the dispersion liquid is lipophilic and therefore insoluble in water. Thus, the sealing coating and the dispersion liquid can be separated by immersion in water or any other appropriate way before the electrophoretic display apparatus is discarded. This makes it possible to collect the dispersion liquid only. It becomes easy to recycle the dispersion liquid.

In the first embodiment described above, the sealing coating 30 is so formed as to cover the whole surface of the cell matrix 10 on the side having the openings 14, as illustrated in FIGS. 3 and 4. However, the invention is not limited to this constitution. In the invention, it is also allowed to form the sealing coating 30 to cover only the openings 14 of the cells 13 while leaving the partitions 12 exposed. Even in such a constitution, the sealing coating 30 covers the exposed surface of the dispersion liquid 20 loaded into the cells 13, and thus the dispersion liquid 20 can be kept tightly sealed.

II. Second Embodiment

In the above-described first embodiment of the invention, a thickening agent may be added to the water-soluble polymer to increase the viscosity of the sealing coating. The second embodiment focuses on this point.

Figure 8:
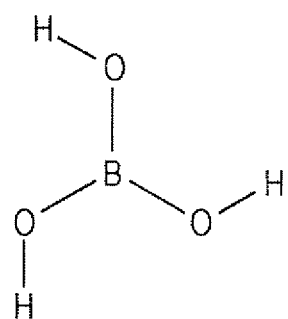
FIG. 8 illustrates a molecular structure of boric acid.

The following describes an exemplary combination, PVA chosen as the water-soluble polymer and boric acid ($H_3BO_3$) chosen as the thickening agent. A molecular structure of boric acid is illustrated in FIG. 8.

Figure 9:
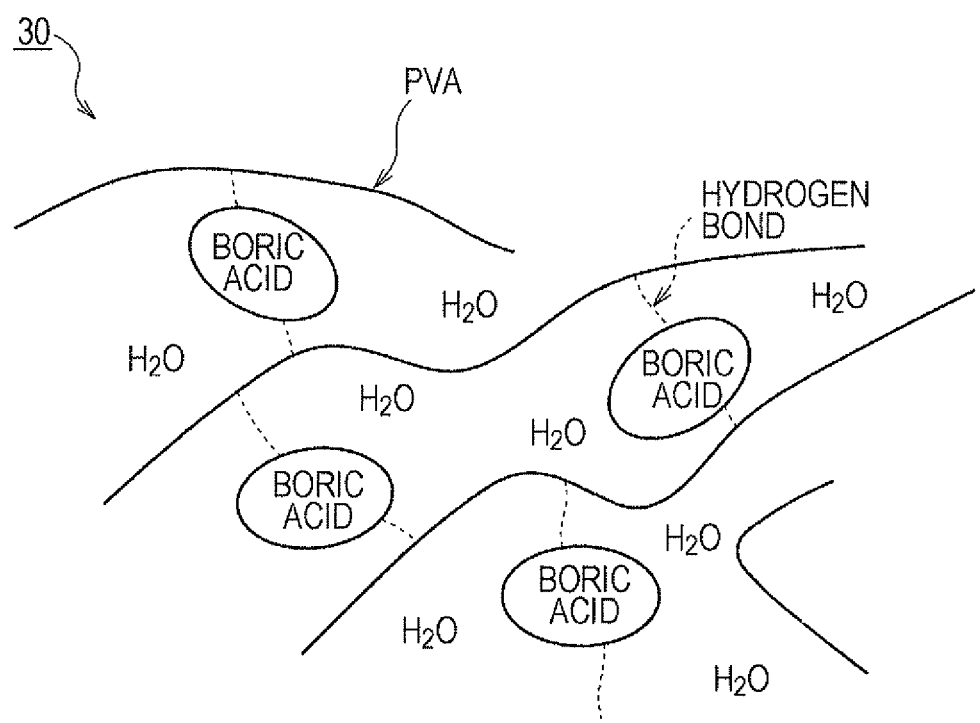
FIG. 9 illustrates the gelatinization of a sealing coating by multiple-point interactions involving boric acid.

In the process of preparing the sealing solution, an aqueous solution containing PVA at a concentration in the range of 3 [wt %] to 40 [wt %] (hereinafter also referred to as the PVA aqueous solution) is combined with an aqueous solution of boric acid with the target concentration of boric acid set in the range of 2 [wt %] to 5 [wt %]. The aqueous solution of boric acid contains borate ions. As illustrated in FIG. 9, in the PVA aqueous solution borate ions link molecules of PVA (i.e., turn the PVA aqueous solution into a gel). This gelatinization occurs through some kind of intermolecular force (e.g., hydrogen bonds, coordinate bonds, or covalent bonds) working at several points. The use of such a thickening agent makes it possible to increase the viscosity of the PVA aqueous solution to a desired value, for example, 1000 [mPa·s] or higher, and to obtain the PVA aqueous solution in the form of a gel.

Then, in the process of applying the sealing solution, this gelatinous PVA aqueous solution is applied with a squeegee or any other appropriate tool to cover the whole surface of the cell matrix 10 on the side having the openings 14. In this way, the sealing coating 30 is formed as illustrated in FIG. 3. Then, in the drying process, the sealing coating 30 is dried at a temperature in the range of room temperature to approximately 50 [° C.] until it is cured. As a result, the sealing coating 30 is thinned as illustrated in FIG. 4.

Some advantages of the addition of a thickening agent (i.e., those of the second embodiment) are summarized in Table 2. The second embodiment provides, besides the advantages of the first embodiment summarized in Table 1, those summarized in Table 2.

TABLE 2

| Material cost | Sealing coating viscosity | Sealing coating thickness | Gelatinization mechanism | Recycling |
|---|---|---|---|---|
| Low | ≥1000 [mPa · s] | 5 to 10 μm | Intermolecular force (e.g., hydrogen bonds) | Possible |

In the first place, as shown in Table 2, boric acid is available at affordable prices. The manufacturing cost of the electrophoretic display apparatus will be reduced accordingly. Also, borate ions make the viscosity of the sealing coating a relatively high and controlled degree, for example, 1000 [mPa·s] or higher. The PVA aqueous solution, having the form of a gel, can have an accordingly reduced solid content.

This reduced solid content will allow making the sealing coating thinner than it is in the first embodiment. More specifically, when the sealing solution is applied to a fixed thickness, the thickness of the dried sealing coating is determined by the solid content of the sealing solution; the smaller the solid content is, the thinner the sealing coating can be made. In this second embodiment, boric acid added to the PVA aqueous solution increases its viscosity (e.g., by turning it into a gel) and lowers its solid content, thereby allowing the dried sealing coating to be thinner than it is in the first embodiment. For example, when the gelatinous PVA aqueous solution is applied to a thickness of 50 [μm], the drying process will thin the sealing coating to a thickness on the order of 5 [μm] to 10 [μm].

Furthermore, this reduced thickness of the sealing coating leads to a shortened distance between the opposite electrode and the dispersion liquid. This will reduce the driving voltage of the electrophoretic display apparatus.

Note that molecules of PVA are linked only via some kind of intermolecular force working between them and borate ions. This means that molecules of PVA can be linked (i.e., the PVA aqueous solution can be turned into a gel) simply by mixing the PVA aqueous solution with an aqueous solution of boric acid during the process of preparing the sealing solution. There is no need for treatment with light, heat, or any other energy source or to use any expensive reagent (e.g., UV

[ultraviolet]-curable resin or a UV curing initiator) or catalyst to form the sealing coating. The sealing coating can be formed easily and at low cost.

Moreover, PVA is still soluble in water even after its molecules are linked via borate ions to form a gel, and therefore the sealing coating is also soluble in water. Thus, as in the cases where no boric acid is used (i.e., the first embodiment), the sealing coating and the dispersion liquid can be separated by immersion in water or any other appropriate way before the electrophoretic display apparatus is discarded, and this makes it possible to collect the dispersion liquid only. It becomes easy to recycle the dispersion liquid.

Additionally, the addition of boric acid to PVA will be no hindrance to forming the sealing coating as a colorless and transparent one; an optical transparency of approximately 90% will be ensured.

Incidentally, in this second embodiment, the thickening agent is not limited to boric acid; for example, it may be copper sulfate. The addition of copper sulfate to the PVA aqueous solution can also provide the advantages shown in Table 2 (although the sealing coating 30 will be formed as a colored and transparent one).

III. Others

In the invention, a plasticizer such as glycerin may be added to the water-soluble polymer. This will give the sealing coating 30 some plasticity. The sealing coating 30, when formed as a plastic one in this way, has a higher degree of bending strength (i.e., resistance to fracture on bending) than that of the form containing no plasticizer.

What is claimed is:

1. A method for manufacturing an electrophoretic display apparatus comprising:
   loading a cell spatially defined by a partition with a dispersion liquid containing an electrophoretically mobile particle and a dispersion medium for dispersing the electrophoretically mobile particle,
   applying a sealing solution to cover an exposed surface of the dispersion liquid loaded in the cell, the sealing solution containing a water-soluble polymer, the water-soluble polymer being dissolved in hydrophilic liquid, and
   forming a sealing coating by drying the sealing solution, wherein:
   the dispersion medium is a lipophilic hydrocarbon solvent, and
   the sealing coating contains a thickening agent to have an increased viscosity, and a target concentration of the thickening agent is from 2 wt % to 5 wt %.

2. The method for manufacturing an electrophoretic display apparatus according to claim 1, wherein
   the water-soluble polymer is polyvinyl alcohol.

3. The method for manufacturing an electrophoretic display apparatus according to claim 1, wherein
   the thickening agent is a gelatinizing agent that turns the sealing coating into a gel by linking molecules of the water-soluble polymer.

4. The method for manufacturing an electrophoretic display apparatus according to claim 3, wherein
   the gelatinizing agent forms a gel through an intermolecular interaction with the water-soluble polymer at a plurality of points.

5. The method for manufacturing an electrophoretic display apparatus according to claim 4, wherein
   the gelatinizing agent is boric acid.

\* \* \* \* \*